UNITED STATES PATENT OFFICE.

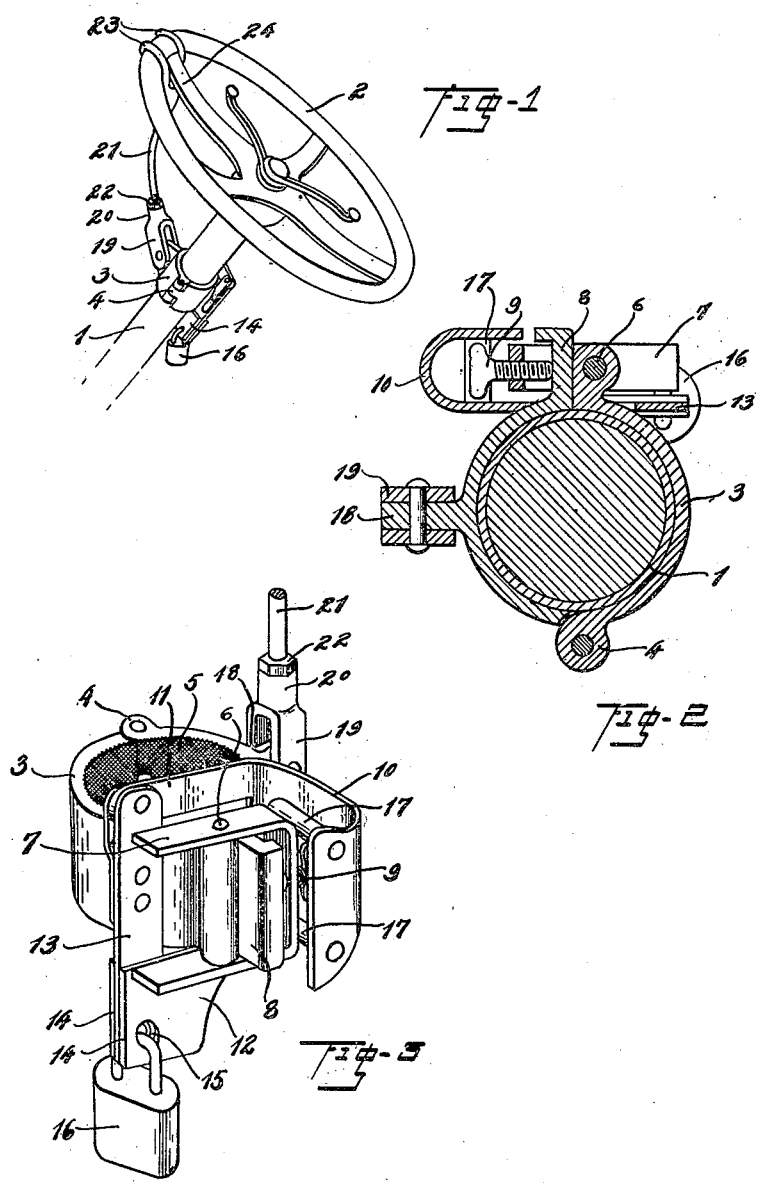

BENJIMAN O. BYERS, OF CLEVELAND, OHIO, ASSIGNOR OF ONE-HALF TO WILLIAM ST JOHN, OF CLEVELAND, OHIO.

AUTO LOCK.

1,421,401.  Specification of Letters Patent.  Patented July 4, 1922.

Application filed February 19, 1920. Serial No. 359,866.

*To all whom it may concern:*

Be it known that I, BENJIMAN O. BYERS, a citizen of the United States, residing at Cleveland, in the county of Cuyahoga and State of Ohio, have invented a certain new and useful Improvement in Auto Locks, of which the following is a full, clear, and exact description, reference being had to the accompanying drawings.

This invention relates to locking devices and more particularly to devices for locking the steering wheel of an automobile in any fixed position.

Some of the objects of the present invention are to provide a locking device which shall be completely removable from the steering parts when not in use; to provide a device which shall be easily adjusted to the steering wheel and permit locking of the wheel in any position; to provide a locking device which shall be simple in construction and inexpensive to manufacture, while further objects and advantages will appear as the description proceeds.

In the accompanying drawings wherein I have shown an illustrated embodiment of my invention, Fig. 1 is a perspective view of my locking device attached to the steering wheel or column of an automobile; Fig. 2 is a transverse sectional view of my device; and Fig. 3 is a perspective view thereof.

Describing the various parts by reference characters, 1 indicates the steering column and 2 the steering wheel of an automobile. The locking device, which is adapted to clamp to the steering column 1 and engage the steering wheel 2, comprises a split sleeve 3 which is hinged as at 4 and provided on the inner surface thereof with a knurled portion 5. A pin 6 is journaled in one end of said sleeve and a yoke 7 is fastened thereto, while the other end of the sleeve is provided with a lip 8 over which the yoke 7 may be swung as indicated in Figs. 2 and 3. A set screw 9 is threaded into the yoke and adapted to engage the lip 8 to draw the sleeve tightly about the column.

In order to prevent access to the set screw 9 by unauthorized persons, a locking shield is positioned therearound. This shield comprises the curved portion 10 which is provided with the two legs 11, 12 which straddle the end of the sleeve 3. A bifurcated arm 13 is pivoted to the end of the leg 11 and is adapted to be swung between the forks 14—14 of the bifurcated end of leg 12. A hole 15 is formed through the forks 14 and the arm 13 to receive the lock 16 which prevents removal of the shield. To prevent access to the set screw 8 from the top or bottom of the curved portion 10 of the shield, the studs 17—17 are positioned thereacross which also serve to strengthen said portion.

A lug 18 is formed on one of the sections of the sleeve 3 and hinged thereto is the forked connection 19 which has an internally threaded shank 20. An arm 21 is adjustably threaded therein and held in position by a lock nut 22 and the upper end of the arm 21 is forked as shown at 23 to straddle one of the spokes 24 of the steering wheel 2 and embrace the rim of said wheel.

In operation the sleeve 3 is positioned loosely about the steering column 1 and the forked end 23 of arm 21 positioned about one of the spokes and the rim of the steering wheel. The set screw 9 is now tightened to draw the sleeve snugly about the column and the shield is then positioned as previously described and locked in place. When not in use the device may be removed from the column, thereby leaving no loose parts to rattle or become engaged with the steering mechansim.

Having thus described my invention, what I claim is:—

A device of the class described comprising a hinged sleeve adapted to engage the steering column of a vehicle, a yoke pivotally fastened to a free end of said sleeve, a projection formed on the other free end of said sleeve, means associated with said yoke and said projection for drawing said sleeve tightly about said column, an arm pivotally fastened to said sleeve and adapted to engage the steering wheel, to prevent rotation thereof, a shield adapted to cover said tightening means to prevent access thereto and means for locking said shield in position.

In testimony whereof, I hereunto affix my signature.

BENJIMAN O. BYERS.